Sept. 27, 1966            M. MORSE            3,275,882

SPHERICAL TRANSPARENT TWO GUN CATHODE RAY TUBE

Filed May 24, 1963

3,275,882
SPHERICAL TRANSPARENT TWO GUN CATHODE RAY TUBE
Milton Morse, 41 Honeck St., Fort Lee, N.J.
Filed May 24, 1963, Ser. No. 283,037
2 Claims. (Cl. 315—13)

This invention relates generally to the field of radar instrumentation, and more particularly to an improved spherical oscilloscope in which the display is in the form of a spherical surface covered by more than a single electron gun, the display raster of each gun covering a different area of the inner surface of a sphere.

It is among the principal objects of the present invention to provide an oscilloscope of the class described which may be used in conjunction with a radar system carried by a moving vehicle, to show representations of surrounding objects located in the vicinity of the vehicle, and at various bearings with respect to the vehicle. It will be understood by those skilled in the art that the disclosed embodiment has many other applications as well.

Another object of the invention lies in the provision of a spherical oscilloscope having a plurality of electron guns disposed therein, each gun having a display raster which impinges upon a transparent fluorescent coating on the inner surface of the sphere, whereby the entire inner surface of the oscilloscope may be visible from a point outside the same.

A further object of the invention lies in the provision of an omnidirectional indicating device in which a plurality of objects may be viewed on a display in proper mutual spatial relationship.

A feature of the invention lies in the fact that the device may be made sufficiently small so as to be conveniently installed in an aircraft control cockpit.

Another feature of the invention lies in the fact that the entire surface of the spherical oscilloscope may be conveniently viewed from a large number of positions on the periphery thereof.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
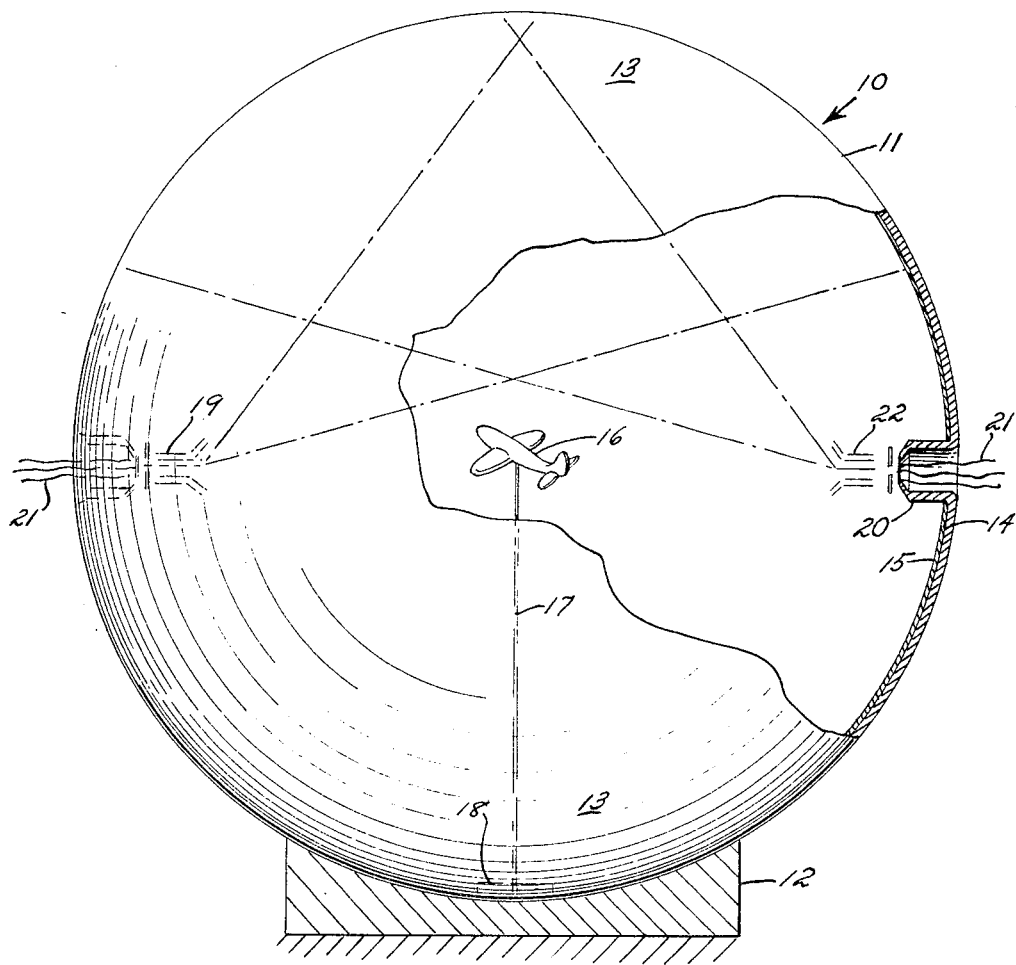
FIGURE 1 is a schematic view of an embodiment of the invention.

In accordance with the invention, there is illustrated in FIGURE 1 a device 10 which includes a spherical glass or other transparent envelope 11. The envelope 11 is mounted upon suitable support means 12 which engages the outer surface 13 at a lower portion thereof.

The inner surface 14 of the envelope 11 is provided with a thin fluorescent coating 15 which is applied in a sufficiently thin layer, using well-known techniques, to permit the same to remain transparent at the interstices formed by the coating particles, although sufficiently heavy to become luminescent under contact with a beam of electrons.

Positioned at the center of the spherical envelope 11 is a model or representation 16 of a vehicle in which the device 10 is mounted, the same being supported by a support member 17 through which electron beams may pass without interference, both the model 16 and support member 17 being preferably of a transparent synthetic resinous material. The support member 17 is anchored to the inner surface of the envelope at point 18. In the alternative, a pointed member (not shown) having a luminous tip may be employed, to indicate the position of the vehicle in which the device 10 is installed.

Positioned generally directly opposite each other are first and second electron guns 19 and 20 of standard type, each including the usual electrical leads 21 and deflecting plate 22 which operate in well-known manner. Although I have chosen to employ two guns 19 and 20, under certain conditions it may be desirable to use more than two, positioning the same such that the display raster of each of the guns covers a predetermined area on the inner surface of the envelope 11.

Figure 2:
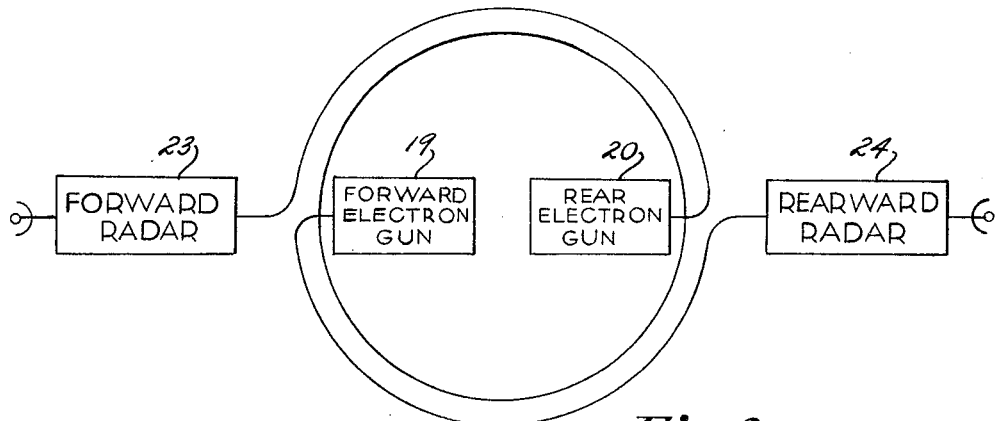
FIGURE 2 is a schematic block diagram showing electrical connections of the component parts.

Referring to FIGURE 2 in the drawing, there is illustrated a block diagram showing how the device 10 is used in conjunction with a pair of radar scanning devices, 23 and 24, each of which is directly connected to its respective electron guns 19 and 20. Where the device 10, for example, is installed within an aircraft, one radar scanning device may be arranged to sweep in a hemispherical path to cover all of the scanning areas forward of a transverse vertical plane, and the other to scan the remaining areas to the sides and rear of the aircraft. The device 10, being positioned in the control cockpit of an aircraft, may be viewed from above or to the sides by the pilot, wherein all aircraft operating in the vicinity may immediately be determined, as well as their location with respect to the aircraft in which the device is installed. The distance between the device and other aircraft may be determined by the size and the brightness of the spots of light which indicate the other aircraft, it thus being possible for the pilot to take the necessary precautionary maneuvers to avoid collisions. The same device may be used to receive an image of a landing field and of the runway upon which the landing is to be made, such information being received by the forward radar apparatus 23.

I wish it to be understood that I do not consider the invention limited to the precise details of structure shown and set forth in this specification, for obvious modifications will occur to those skilled in the art to which the invention pertains.

I claim:

1. A spherical oscilloscope device, including: a spherical transparent globe having inner and outer surfaces, a fluorescent coating applied to said inner surface in a sufficiently thin layer to be at least partially transparent when viewed from the outer surface of said globe, a plurality of electron guns mounted within said globe, each positioned to project a deflectable electron beam over mutually exclusive areas of said fluorescent coating.

2. A spherical oscilloscope device, including: a spherical transparent globe having inner and outer surfaces, a fluorescent coating applied to said inner surface in a sufficiently thin layer to be at least partially transparent when viewed from the outer surface of said globe, a plurality of electron guns mounted within said globe, each positioned to project a deflectable electron beam over mutually exclusive areas of said fluorescent coating; and a plurality of radar sweep means corresponding in number to the number of said electron guns, said radar sweep means each covering an angularly coextensive field of view corresponding to the angular display raster swept by said electron guns.

References Cited by the Examiner

UNITED STATES PATENTS

| | | | |
|---|---|---|---|
| 2,098,231 | 11/1937 | Du Mont | 334—33 |
| 2,976,449 | 3/1961 | Larson | 313—109 |
| 3,184,630 | 5/1965 | Geer | 315—13 X |

OTHER REFERENCES

Law, R. R.: Contrast in Kinescopes, in RCA publication No. St.–119, August 1939 (reprinted from Proceedings of the IRE).

DAVID G. REDINBAUGH, *Primary Examiner.*

JOHN W. CALDWELL, *Examiner.*

T. A. GALLAGHER, *Assistant Examiner.*